United States Patent
Sato (10) Patent No.: US 9,354,472 B2
(45) Date of Patent: May 31, 2016

(54) POLARIZED LIGHT IRRADIATING APPARATUS AND METHOD OF IRRADIATING POLARIZED LIGHT FOR PHOTO ALIGNMENT

(71) Applicant: USHIO DENKI KABUSHIKI KAISHA, Tokyo (JP)

(72) Inventor: Shingo Sato, Shizuoka (JP)

(73) Assignee: Ushio Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 14/201,159

(22) Filed: Mar. 7, 2014

(65) Prior Publication Data

US 2014/0332698 A1    Nov. 13, 2014

(30) Foreign Application Priority Data

Mar. 8, 2013  (JP) ................. 2013-047350

(51) Int. Cl.
*G02F 1/1337* (2006.01)
*G02F 1/13* (2006.01)

(52) U.S. Cl.
CPC ........ *G02F 1/133788* (2013.01); *G02F 1/1303* (2013.01)

(58) Field of Classification Search
USPC ................................ 349/123–132
See application file for complete search history.

(56) References Cited

U.S. PATENT DOCUMENTS 8,553,203 B2 * 10/2013 Shibazaki ................. 355/72
8,917,378 B2 * 12/2014 Nara ......................... 355/67

2006/0022613 A1   2/2006  Suzuki et al.
2008/0187871 A1   8/2008  Fukui et al.
2014/0160457 A1 * 6/2014  Kao et al. ................. 355/77
2014/0322852 A1 * 10/2014 Joo et al. ................. 438/46

FOREIGN PATENT DOCUMENTS

| | | |
|---|---|---|
| JP | 2006-332015 A | 12/2006 |
| JP | 2007-114647 A | 5/2007 |
| JP | 2008-116676 A | 5/2008 |
| JP | 2009-265290 A | 11/2009 |
| JP | 2009-295950 A | 12/2009 |
| JP | 2010-054849 A | 3/2010 |
| JP | 2010-072615 A | 4/2010 |
| JP | 2011-203291 A | 10/2011 |
| JP | 4815995 B2 | 11/2011 |
| JP | 2012-113095 A | 6/2012 |
| JP | 5105567 B1 | 12/2012 |
| TW | 546700 B | 8/2003 |
| TW | 201109802 A | 3/2011 |
| TW | 201217870 A | 5/2012 |
| TW | 201246264 A | 11/2012 |
| TW | I378304 B | 12/2012 |

* cited by examiner

*Primary Examiner* — Hoan C Nguyen
(74) *Attorney, Agent, or Firm* — Michael Best & Friedrich LLP

(57) ABSTRACT

An apparatus capable of performing a photo alignment process on a plate-shaped member and realizing high productivity is provided. An irradiating unit irradiates an irradiated area with polarized light, and a stage movement mechanism transports first and second stages on which substrates are mounted alternately to the irradiated area and returns the same. A space larger than a length by which the substrate on the second stage passes through the irradiated area is secured between the first stage positioned at a first substrate mounting-and-collecting position and the irradiated area, and a space larger than a length by which the substrate on the first stage passes through the irradiated area is secured between the second stage positioned at a second substrate mounting-and-collecting position and the irradiated area.

5 Claims, 6 Drawing Sheets

POLARIZED LIGHT IRRADIATING APPARATUS AND METHOD OF IRRADIATING POLARIZED LIGHT FOR PHOTO ALIGNMENT

CROSS-REFERENCES TO RELATED APPLICATION

This application claims priority from Japanese Patent Application Serial No. 2013-047350 filed on Mar. 8, 2013, the contents of which, including specification, claims and drawings, are incorporated herein by reference in their entirety.

BACKGROUND OF THE INVENTION

1. Technical Field

The present invention relates to a polarized light irradiating technology to be performed for photo alignment.

2. Background Art

In recent years, a technology referred to as Photo Alignment which is a technology for performing alignment by light irradiation when obtaining an alignment layer in an alignment film or an angle of view field compensation film of an liquid crystal display device exemplified principally by a liquid crystal panel has started to be employed. Hereinafter, the film or the layer in which alignment is caused by using the light irradiation is collectively referred to as photo alignment film. The term "alignment" or "alignment process" means giving a directional property to a certain property of an object.

Photo alignment is achieved by irradiating a film for photo alignment (hereinafter, referred to as a "film material") with polarized light. The film material is formed of a resin such as polyimide, and the film material is irradiated with polarized light polarized in a desired direction (the direction to be aligned). With an irradiation of polarized light having a predetermined wavelength, a molecular structure (for example, a side chain) of the film material is aligned with the direction of the polarized light, so that a photo alignment film is obtained.

The photo alignment film is increased in size in association with an increase in size of liquid crystal panel in which the photo alignment film is used. Therefore, a required width of the irradiation area of the polarized light is increased to 1500 mm or wider. Examples of the polarized light irradiating apparatuses having a wide irradiated area includes an apparatus disclosed in Japanese Patent No. 4815995. The apparatus includes a rod-like light source having a length corresponding to the width of the irradiated area, and a wire grid polarized light element configured to polarize light from the light source, and is configured to irradiate a film material transported in a direction orthogonal to the longitudinal direction of the light source with polarized light.

In the polarized light irradiating apparatus for photo alignment described above, there are a case where an object (work) of the polarized light irradiation is a film material having a continuously extending elongated shape (hereinafter, referred to as an elongated work), and a case where a film material is already provided on a liquid crystal substrate and hence the liquid crystal substrate with a film material is a work.

Japanese Patent No. 4815995 discloses an apparatus in which the elongated work is wound into a roll, and an elongated work drawn from the roll is irradiated with polarized light. The elongated work irradiated with the polarized light at the time of roll-to-roll transport is cut at a predetermined position and adhered to the liquid crystal substrate. In contrast, as regards the polarized light irradiating apparatus configured to irradiate the liquid crystal substrate with the film material with the polarized light, no Cited Reference which discloses a configuration of an apparatus which has a performance of efficient processing (in a short tact time) is found.

SUMMARY OF THE INVENTION

In view of such circumstances, it is an object of the invention to provide an apparatus configured to be capable of performing a photo alignment process on a plate-shaped member coated with a film material such as a liquid crystal substrate coated with a film, and such an apparatus and a method which realize a high productivity.

In order to solve the above-described problem, a first aspect of the invention is directed to a polarized light irradiating apparatus for photo alignment including:

an irradiating unit configured to irradiate a preset irradiated area with polarized light;

a stage on which a substrate is placed; and a stage movement mechanism configured to cause the substrate on the stage to be irradiated with the polarized light by moving the stage to the irradiated area, wherein the stage includes two of first and second stages;

the stage movement mechanism is configured to move the first stage from a first substrate mounting position set on one side of the irradiated area to the irradiated area and to move the second stage from a second substrate mounting position set on the other side of the irradiated area to the irradiated area, the stage movement mechanism is configured to return the first stage to a first side after passage of the substrate on the first stage through the irradiated area and to return the second stage to a second side after passage of the substrate on the second stage through the irradiated area, and a space larger than a length by which the substrate on the second stage passes through the irradiated area is secured between the first stage positioned at the first substrate mounting position and the irradiated area, and a space larger than a length by which the substrate on the first stage passes through the irradiated area is secured between the second stage positioned at the second substrate mounting position and the irradiated area.

A second aspect of the invention is directed to the first aspect of the invention, wherein the irradiating unit is configured to irradiate the substrates on the respective stages with the polarized light when the first and second stages move both outbound and homebound.

A third aspect of the invention is directed to the first or second aspect of the invention, wherein the first and second stages each are provided with a substrate aligner configured to direct the orientation of the substrate mounted thereon to a predetermined orientation with respect to a polarized light axis to be irradiated.

A fourth aspect of the invention is directed to the first, second or third aspect of the invention, wherein the stage movement mechanism includes a guide member along a direction of movement of the first and second stages, and the guide member is used both as a guide for the movement of the first stage and a guide for the movement of the second stage.

A fifth aspect of the invention is directed to a polarized light irradiating method for photo alignment for irradiating a substrate with polarized light for photo alignment by using the polarized light irradiating apparatus for photo alignment according to any of the first to fourth aspects of the invention, including:

a first substrate mounting step of mounting a substrate on the first stage at the first substrate mounting position;

a second substrate mounting step of mounting a substrate on the second stage at the second substrate mounting position;

a first movement step of moving the first stage on which the substrate is mounted from the first substrate mounting position and returning the first stage to a first substrate collecting position set on the one side after passage of the substrate through the irradiating area;

a second movement step of moving the second stage on which the substrate is mounted from the second substrate mounting position and returning the second stage to a second substrate collecting position set on the other side after passage of the substrate through the irradiating area;

a first substrate collecting step of collecting the substrate from the first stage at the first substrate collecting position; and a second substrate collecting step of collecting the substrate from the second stage at the second substrate collecting position, wherein a time zone during which the first substrate collecting step and the first substrate mounting step are performed overlaps entirely or partly with a time zone during which the second movement step is performed, and a time zone during which the second substrate collecting step and the second substrate mounting step are performed overlaps entirely or partly with a time zone during which the first movement step is performed.

As described below, according to the first or fifth aspect of the invention, the two stages pass through the irradiating area alternately, and hence the substrates on the respective stages are irradiated with polarized light, so that a photo alignment process with high productivity is realized by reducing a tact time. At this time, the space having at least the length by which the substrate on the second stage can pass through the irradiated area is secured between the first substrate mounting position and the irradiated area, and the space having at least the length by which the substrate on the first stage can pass through the irradiated area is secured between the second substrate mounting position and the irradiated area. Therefore, the stages are prevented from interfering with each other, and the photo alignment process is performed with high uniformity.

According to the second aspect of the invention, in addition to the above-described advantages, the substrates on the first and the second stages are irradiated with light in both the outbound and the homebound, the photo alignment process is performed efficiently without wasting energy, and the productivity may be enhanced by increasing the speed of movement.

According to the third aspect of the invention, since the substrate aligner is provided in addition to the above-described advantages, accurate irradiation of the polarized light is achieved in a state in which the substrate is oriented to a predetermined orientation with respect to the polarized light axis of the polarized light. Therefore, accuracy and the quality of the photo alignment process may be kept at a high level.

According to the fourth aspect of the invention, in addition to the above-described advantage, since the pair of guide members are also used for moving the first and second stages, the configuration of the stage movement mechanism is simplified, and the cost of the apparatus is reduced.

DETAILED DESCRIPTION OF THE INVENTION

Subsequently, a mode for executing the invention of the present application (hereinafter, referred to as an embodiment) will be described.

Figure 1:
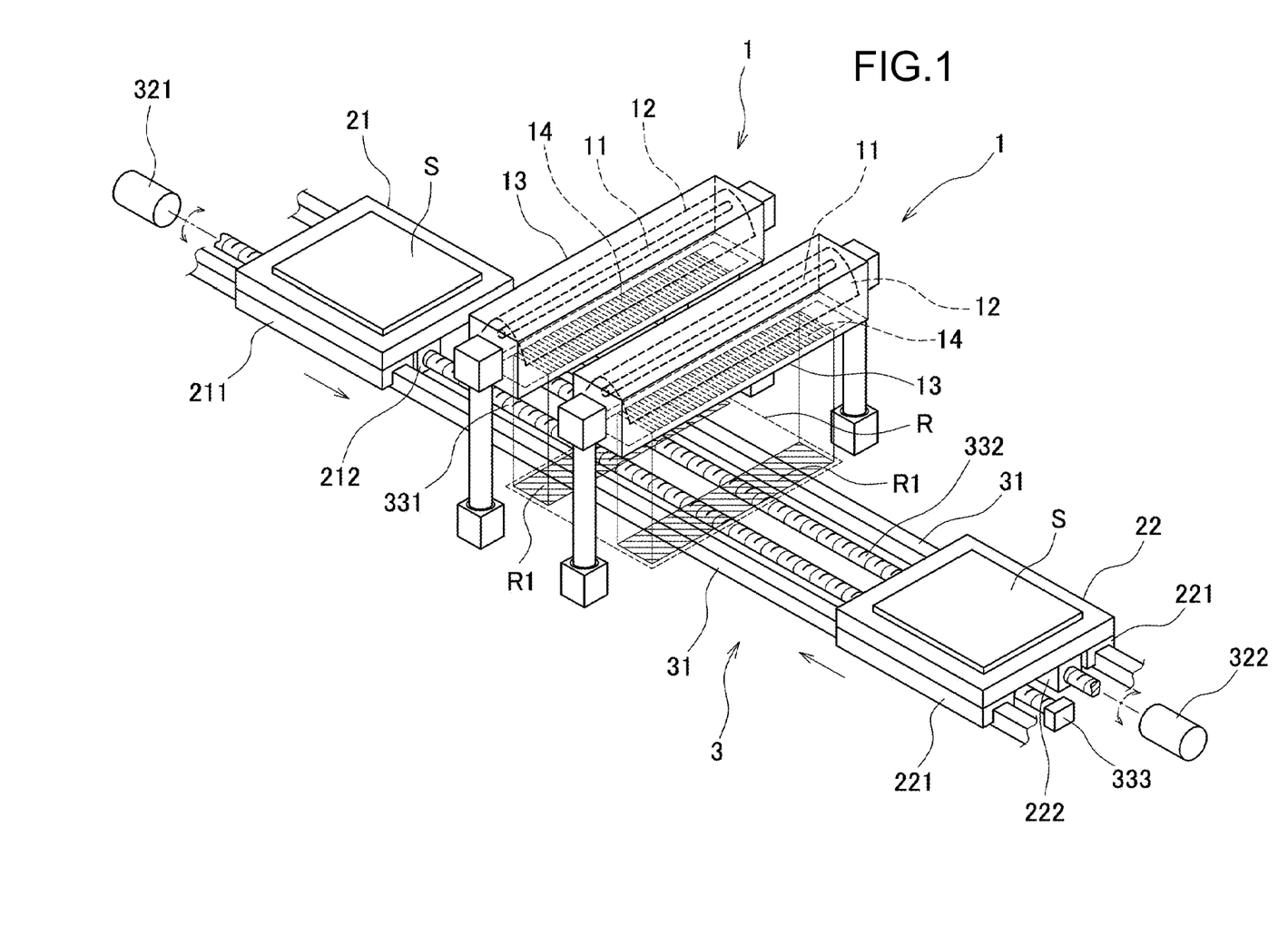
FIG. 1 is a schematic perspective view of a polarized light irradiating apparatus for photo alignment according to an embodiment of the invention.

FIG. 1 is a schematic perspective view of a polarized light irradiating apparatus for photo alignment according to an embodiment of the invention. The polarized light irradiating apparatus illustrated in FIG. 1 is an apparatus configured to perform a photo alignment process on substrates S such as liquid crystal substrates each coated with a film material as works.

Specifically, the apparatus illustrated in FIG. 1 includes irradiating units 1 configured to irradiate a preset irradiated area R with polarized light, stages 21 and 22 on which the substrates S are placed, and a stage movement mechanism 3 configured to move the stages 21 and 22 to the irradiated area R to allow the liquid crystal substrates S on the stages 21 and 22 to be irradiated with the polarized light.

As illustrated in FIG. 1, two irradiating units are provided in the embodiment. The direction of arrangement of the irradiating units 1 is the direction of movement of the stages 21 and 22. The respective irradiating units 1 both have the same configuration, and are configured to irradiate the polarized light in a substantially rectangular pattern R1. Therefore, in the embodiment, a substantially rectangular area including two substantially rectangular irradiating patterns R1 (two irradiating patterns R1 are included) is set as an irradiated area R. The two irradiating patterns R1 may be or may not be partly overlapped with each other. As illustrated in FIG. 1, the irradiated area R is an area included in a horizontal plane.

The stage movement mechanism 3 is a mechanism configured to move the stages 21 and 22 so as to pass through the irradiated area R. In the embodiment, the stages 21 and 22 are arranged in a horizontal position, and the direction of movement is a horizontal direction. Hereinafter, for the sake of convenience of description, the direction of movement of the stage movement mechanism 3 is referred to as a length direction, and the horizontal direction vertical to the direction of movement is referred to as a width direction.

Figure 2:
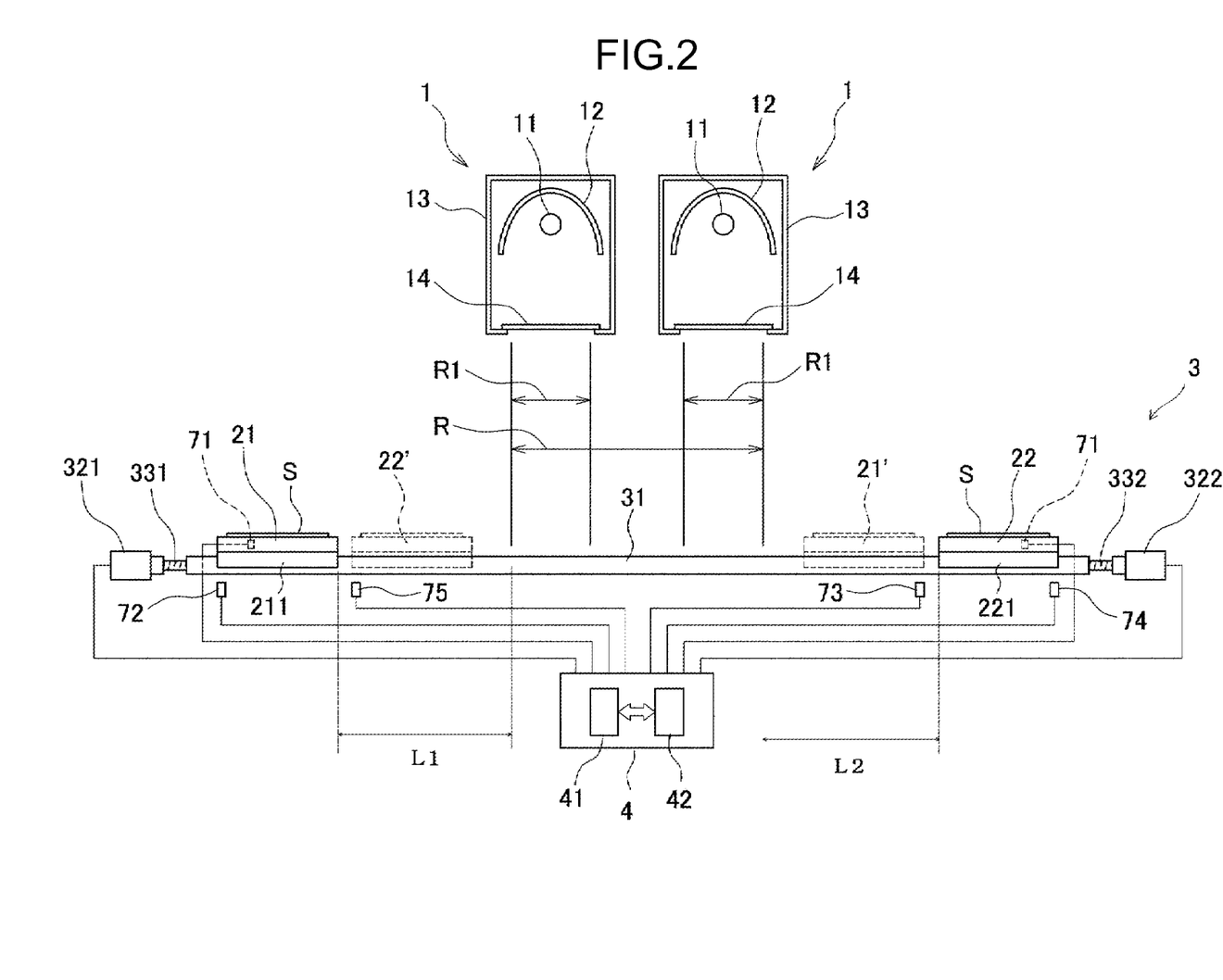
FIG. 2 is a schematic front view of the polarized light irradiating apparatus illustrated in FIG. 1.

FIG. 2 is a schematic front view of the polarized light irradiating apparatus illustrated in FIG. 1. As illustrated in FIG. 2, the irradiating units 1 each include a light source 11, a mirror 12 provided on the rear side of the light source 11, a lamp house 13 including the light source 11 and the mirror 12 accommodated in the interior thereof, and a polarized light element 14 and the like.

The light source 11 includes a rod-shaped lamp. In the embodiment, since the photo alignment is performed with light of an ultraviolet region, a high-pressure mercury lamp or a metal halide lamp including other metals in addition to mercury is used. It is also possible to obtain a long irradiating pattern by arranging a plurality of LEDs configured to radiate light having a wavelength required for the ultraviolet region. The mirror 12 is configured to perform efficient irradiation of the polarized light, and a gutter-shaped mirror having a shape which constitutes part of an oval or a parabolic shape in cross section is used. The longitudinal pair of left and right mirrors are arranged so as to form a slit to achieve a substantially gutter-shaped mirror.

The polarized light element 14 has a function to convert light radiated from the light source 11 into a polarized light required for photo alignment. As the polarized light element 14, a wire grid polarized light element provided with fine mesh formed of stripe dielectrics (or conductive or semiconductor) material on a transparent substrate may be used. The lamp house 13 has a light irradiation port, and the polarized light element 14 is arranged at a position between the light source 11 and the light irradiation port. A single polarized light element 14 has a small rectangular shape in many cases, and a configuration in which a plurality of the polarized light elements 14 are arranged in the width direction (the length direction of the light source 11) to irradiate the irradiated area R with the polarized light is generally employed. A structure of being mounted on the lamp house 13 as a unit (polarized light element) different from the lamp house 13 may be employed as the polarized light elements 14. In addition, a filter for adjusting characteristics of the polarized light to be irradiated such as selection of the wavelength may be arranged.

Figure 3:
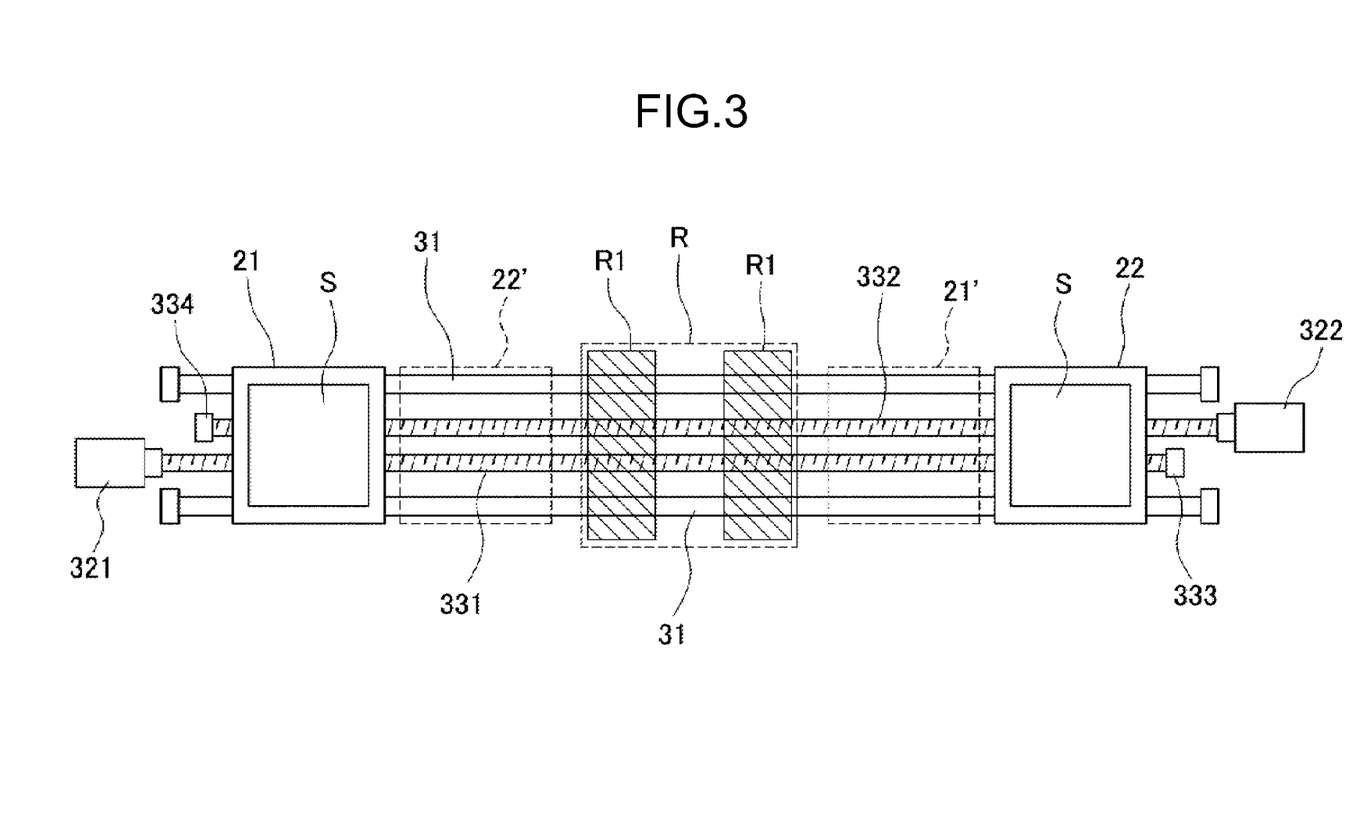
FIG. 3 is a schematic plan view of a stage movement mechanism 3 illustrated in FIG. 1.

In other words, as illustrated in FIG. 1, the apparatus of the embodiment includes the two stages 21 and 22. Hereinafter, the two stages 21 and 22 are referred to as a first stage 21 and a second stage 22, respectively. The stage movement mechanism 3 for moving the stages 21 and 22 will be described in further detail with reference to FIG. 1, FIG. 2, and FIG. 3. FIG. 3 is a schematic plan view of the stage movement mechanism 3 illustrated in FIG. 1. FIG. 2 illustrates the stage movement mechanism 3 illustrated in FIG. 1 together with a control system thereof.

As illustrated in FIG. 1 to FIG. 3, the stage movement mechanism 3 includes guide members 31 extending so as to penetrate through the irradiated area R, and drive sources 321 and 322 configured to move the first and second stages 21 and 22 along the guide member 31. As illustrated in FIG. 1 and FIG. 3, two guide members 31 are provided with the irradiated area R interposed therebetween. The guide members 31, specifically, are linear guides, and extend in parallel to each other. The two stages 21 and 22 are moved by being guided along the two guide members 31. In other words, the two guide members 31 are used both as a guide for the first stage 21 and the second stage 22.

A pair of guide blocks 211 are fixed to a lower surface of the first stage 21. The position of fixation of the guide blocks 211 corresponds to the positions of the guide members 31 on both sides. Bearings are provided in the interior of the guide blocks 211, and the first stage 21 is arranged in a state in which the guide members 31 on both sides penetrate through the guide blocks 211, so that the first stage 21 is guided by the guide members 31. The second stage 22 has the same structure, and the guide members 31 penetrate through the pair of the guide blocks 221 fixed to the lower surface thereof, whereby the movement of the second stage 22 is guided.

The movements of the respective stages 21 and 22 are performed by the drive sources 321 and 322 rotating ball screws 331 and 332. In other words, as illustrated in FIG. 1 and FIG. 3, the stage movement mechanism 3 includes a first ball screw 331 configured to move the first stage and a second ball screw 332 configured to move the second stage 22.

One end of the first ball screw 331 is coupled to a first drive source 321, and the other end thereof is supported by a bearing 333. In the same manner, one end of the second ball screw 332 is coupled to a second drive source 322, and the other end thereof is supported by a bearing 334. The first and second ball screws 331 and 332 are arranged so as to extend in parallel to the direction in which a pair of the guide members 31 extend with high degree of accuracy.

A driven block 212 in which the first ball screw 331 is screwed (in which the screw is engaged) is fixed to a substantial center of the lower surface of the first stage 21. The first drive source 321 is a motor such as an AC servo motor, and when the first drive source 321 rotates the first ball screw 331, the first stage 21 is linearly moved while being guided by a pair of the guide members 31. In the same manner, a driven block 222 in which the second ball screw 332 is screwed is fixed to a substantial center of the lower surface of the second stage 22, and when the second drive source 322 rotates the second ball screw 332, the second stage 22 is linearly moved by being guided by a pair of the guide members 31.

The polarized light irradiating apparatus of the embodiment includes a control unit 4 configured to control the entire apparatus. The control unit 4 includes a memory 41 in which a sequence program for controlling operations of respective parts such as the stage movement mechanism 3 is memorized, and an arithmetic processing unit 42 configured to execute the sequence program. A control signal from the control unit 4 is transmitted to the respective parts of the apparatus including the two drive sources 321 and 322.

Figure 4:
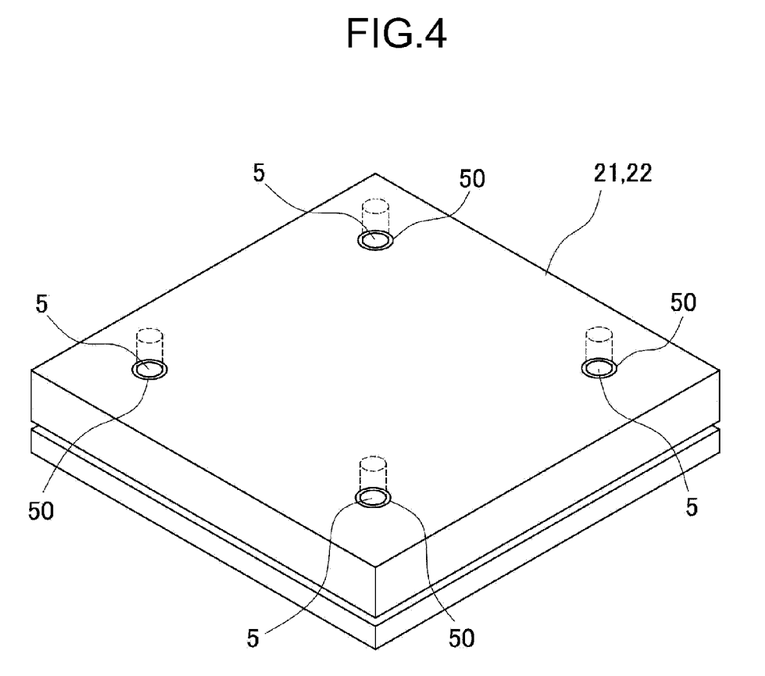
FIG. 4 is a schematic perspective view illustrating a mechanism for mounting or collecting a substrate S on stages 21 and 22.

In contrast, the polarized light irradiating apparatus of the embodiment is also provided with a mechanism for mounting the substrates S on the stages 21 and 22 and collecting the substrates S from the stages 21 and 22. This point will be described with reference to FIG. 4. FIG. 4 is a schematic perspective view illustrating a mechanism for mounting or collecting the substrate S on the stage 21 or 22.

For irradiation of the polarized light, the substrate S needs to be placed on the stage 21 or 22. The substrate S irradiated with the polarized light needs to be collected from the stage 21 or 22. Such actions may be performed manually, but generally is performed by a robot in a mass-production line. In this case, a hand of the robot needs to be prevented from interfering with the stage 21 and 22. As a configuration for this need, the stage 21 and 22 of the embodiment include elevating pins 5 integrated therein.

In other words, the stages 21 and 22 are each provided with pin holes 50 as illustrated in FIG. 4. The pin holes 50 are holes extending in the vertical direction and reach the surfaces of the stage 21 or 22. Three or four of the pin holes 50 are provided at equivalent positions with respect to centers of the stage 21 or 22, and the elevating pin 5 are arranged in the interiors of the respective pin holes 50. The respective elevating pins 5 are movable upward and downward synchronously with an elevating mechanism, which is not illustrated. When placing the substrate S on the stage 21 or 22, the respective pins 5 are moved upward to upper limit positions. In this state, the robot that holds the substrate S moves the substrate S upward of the stage 21 or 22, and moves downward as is, whereby the substrate S is placed on the respective pins. Then, the hand of the robot is retracted, and then the respective elevating pins 5 are moved integrally downward to place the substrate S on the stage 21 or 22.

When collecting the substrate S after the irradiation of the polarized light, an operation opposite therefrom is performed. The respective elevating pins 5 are moved integrally upward to lift the substrate S, and the hand of the robot is inserted into the lower side of the lifted substrate S to collect the substrate S. Examples of the mechanism employed here for transmitting the substrate S to a range where the robot is operable include a lot transport mechanism such as an AGV (Auto Guided Vehicle) or a sheet feed mechanism such as an air conveyer.

The apparatus of the embodiment moves the first and second stages 21 and 22 to pass through the irradiated area R alternately by the stage movement mechanism 3, so that the substrates S on the stages 21 and 22 are irradiated with the polarized light alternately. In this case, the stage movement mechanism 3 is configured so that the integrated exposure amount of the polarized light at respective points on the substrate S does not become uneven. This point will be described below with reference to FIG. 3.

In the apparatus of the embodiment, mounting of the substrate S on the first stage 21 and collection of the substrate S from the first stage 21 are performed at the same position. Hereinafter, this position is referred to as a first substrate mounting-and-collecting position. In the same manner, mounting of the substrate S on the second stage 22 and collection of the substrate S from the second stage 22 are performed at the same position. Hereinafter, this position is referred to as a second substrate mounting-and-collecting position. The first substrate mounting-and-collecting position is set to one side (the left side as illustrated in FIG. 3, for example) of the irradiated area R, and the second substrate mounting-and-collecting position is set to the other side (the right side as illustrated in FIG. 3, for example) of the irradiated area R.

The stage movement mechanism 3 moves the first stage 21 on which the substrate S is mounted to the irradiated area R at the first substrate mounting-and-collecting position and passed therethrough, and then is returned back. Then, the substrate S is collected from the first stage 21 at the first substrate mounting-and-collecting position. The stage movement mechanism 3 moves the second stage 22 on which the substrate S is mounted at the second substrate mounting-and-collecting position to the irradiated area R to and passed therethrough, and then is returned back. Then, the substrate S is collected from the second stage 22 at the second substrate mounting-and-collecting position. For the sake of convenience of description, the position at which the first stage 21 moved forward changes the direction of movement backward is referred to as a first forward limit position, and the position at which the second stage 22 moved forward changes the direction of movement backward is referred to as a second forward limit position. In FIG. 2 and FIG. 3, the first stage positioned at the first forward limit position is illustrated by reference numeral 21' and the second stage positioned at the second forward limit position is illustrated by reference numeral 22'.

In the apparatus of the embodiment described above, the respective substrate mounting-and-collecting positions are optimized in accordance with the sizes of the stages 21 and 22 and the position and the size of the irradiated area R. In other words, in the apparatus of the embodiment, at least a length of the substrate S on the second stage 22 (the length in the direction of movement of the stages 21 and 22) is secured as a space (hereinafter, referred to as a first space) between the first stage 21 positioned at the first substrate mounting-and-collecting position and the irradiated area R. In other words, the first space is a space which prevents interference with the first stage 21 even when the second stage 22' reaches the second forward limit position. Preferably, the length (designated by L1 in FIG. 2) of the first space is at least the length of the second stage 22.

At least a length of the substrate S on the first stage 21 is secured as a space (hereinafter, referred to as a second space) between the second stage 22 positioned at the second substrate mounting-and-collecting position and the irradiated area R. In other words, the second space is a space which prevents interference with the second stage 22 even when the first stage 21' reaches the first forward limit position. Preferably, the length (designated by L2 in FIG. 2) of the second space is at least the length of the first stage 21.

In the embodiment, the first stage 21 and the second stage 22 have the same size W, and hence a relationship L1=L2>W is satisfied. More specifically, for example, when the substrate S has a size on the order of 1500×1800 mm, the length W of the stages 21 and 22 is on the order of 1550×1850 mm, and the value of L1=L2 is on the order of 2600 mm. The length of the ball screws 331 and 332 of the stage movement mechanism 3 is selected and the movement strokes of the respective stages 21 and 22 are set so as to secure the space described above.

Figure 5:
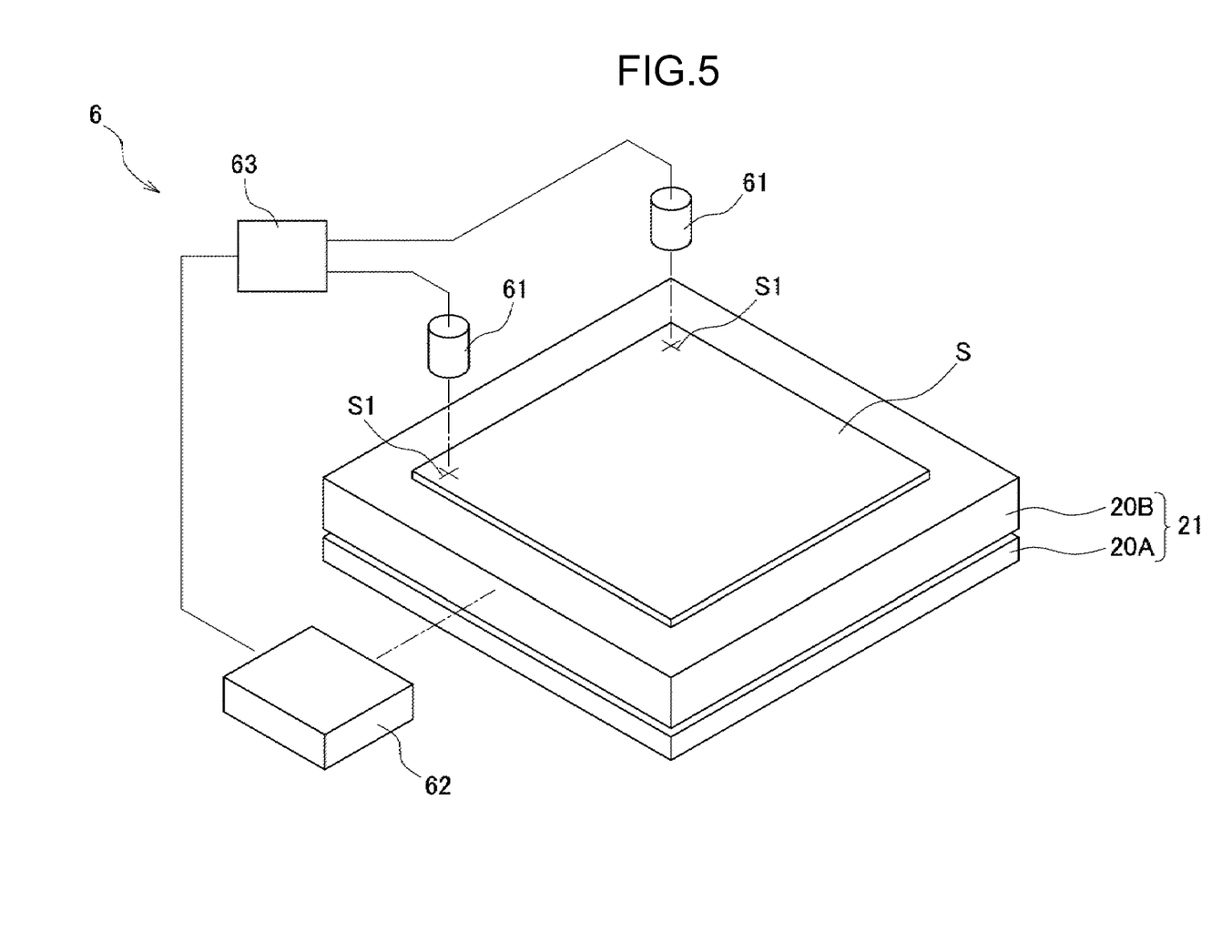
FIG. 5 is a perspective view illustrating a schematic configuration of a substrate aligner 6 provided on the apparatus of the embodiment.

The apparatus of the embodiment includes a substrate aligner 6 configured to adjust the position or the orientation of the substrate S so that the irradiation of the polarized light for the photo alignment is correctly performed. Referring now to FIG. 5, the substrate aligner 6 will be described. FIG. 5 is a perspective view illustrating a schematic configuration of the substrate aligner 6 provided on the apparatus of the embodiment. In FIG. 5, the substrate aligner 6 provided on the first stage 21 is illustrated as an example. However, the second stage 22 has also the same configuration. As illustrated in FIG. 5, the first stage includes a fixed base 20A and a movable base 20B provided on the fixed base 20A, for example. The driven block 212 and the guide blocks 211 described above are members fixed to a lower surface of the fixed base 20A.

The movable base 20B is provided so as to be movable in the directions XYθ on the fixed base 20A. In other words, a XYθ movable mechanism 62 is provided on the fixed base 20A, and the XYθ movable mechanism 62 is configured to move the movable base 20B in the XYθ directions for a fine adjustment of the position and the posture of the movable base 20B. The XY direction in this case is orthogonal directions in a horizontal plane, and, for example, the X-direction corresponds to the length direction (direction of movement), and the Y-direction corresponds to the width direction. Reference sign θ corresponds to a circumferential direction about an axis vertical to the XY direction and, in this example, corresponds to a circumferential direction about the perpendicular axis. Since a variety of types of the XYθ movable mechanisms 62 are in the market from various companies, a suitable type can be selected and integrated. Therefore, detailed description and illustration are omitted.

The XYθ movable mechanism 62 may be used also for the movement of the stage movement mechanism 3 in one of the XY directions, and may be configured as an Xθ movable mechanism or a Yθ movable mechanism.

In contrast, the substrates S to be placed on the stages 21 and 22 are each provided with alignment marks S1. The substrate aligner 6 mainly includes alignment sensors 61 configured to take an image of the alignment marks S1 and the XYθ movable mechanism 62, and an alignment control unit 63 configured to control the XYθ movable mechanism 62 in accordance with the output from the alignment sensor 61.

The alignment marks S1 are normally provided at predetermined two positions on each of the substrates S. Two alignment sensors 61 are provided so as to image the alignment marks S1 at predetermined positions in accordance with the positions of the alignment marks S1 and reference positions or a reference directions to be aligned.

For example, as illustrated in FIG. 5, the alignment marks S1 are provided at two corners along the width direction of the square substrate S. The alignment sensors 61 are arranged above a position where the operation of mounting of the substrate S on the first stage 21 is performed (hereinafter referring to as a mounting position). The positions of the two alignment sensors 61 correspond to the distance between the alignment marks S1 on the substrate S, and the direction of a line connecting the two alignment sensors 61 corresponds to the width direction of the stage movement mechanism 3.

As described above, when the substrate S is mounted on the first stage 21, a state in which the respective alignment sensors 61 image the respective alignment marks S1 is achieved. A reference position is set in an imaging area of each of the alignment sensors 61, and the reference position is a position where the center of the alignment mark S1 is to be positioned.

The alignment control unit 63 processes output data (image data) from each of the alignment sensors 61, and controls the XYθ movable mechanism 62 to perform alignment. Specifically, the alignment control unit 63 computes data of the distance of movement in the XYθ directions of the second stage 22 so that centers of gravity of the alignment marks S1 to be imaged by the alignment sensors 61 come to the reference positions on the basis of positional information on the respective alignment marks S1 detected by the two alignment sensors 61 and distance information of the two alignment marks S1 input in advance in the alignment control unit 63, thereby controlling the XYθ movable mechanism 62 and moving the movable base 20B in the XYθ directions. Alignment is now completed.

When the alignment is completed, the line connecting the two alignment marks S1 (the width direction of the mounted substrate S) is positioned in the width direction of the stage movement mechanism 3 accurately. The substrate S also takes a predetermined position in the width direction. The predetermined position means, for example, a position at exactly the center of the two guide members 31.

The XYθ movable mechanism 62 is configured to fix the position and the posture of the movable base 20B while the substrate S is placed on the movable base 20B. Therefore, the width direction of the substrate S matches the width direction of the stage movement mechanism 3, and the substrate S is moved linearly in the direction of movement and transported in a state of being located at the predetermined position in the width direction.

Although it is necessary to position the substrate S roughly at the position on the movable base 20B, the alignment mark S1 of which is imaged by the alignment sensors 61, this arrangement may just be teaching to the robot when mounting the substrate S by using the robot. When positioning is performed manually, there is a case where a member such as a receiving plate is provided on the movable base 20B, and the substrate S is arranged in contact therewith to achieve rough positioning.

The apparatus of the embodiment includes several sensors for confirming the positions or the states of the two stages 21 and 22. This point will be described with reference to FIG. 2.

First of all, a sensor (hereinafter, referred to as a substrate sensor) 71 configured to detect the placement of the substrate S is provided in the interior of the respective stages 21 and 22. The stage movement mechanism 3 includes a sensor (hereinafter, referred to as a first load position sensor) 72 configured to detect that the first stage 21 is positioned at the first substrate mounting-and-collecting position, a sensor (hereinafter, referred to as a first limit position sensor) 73 configured to detect that the first stage 21 is positioned at a forward limit position, a sensor (hereinafter, referred to as a second load position sensor) 74 configured to detect that the second stage 22 is positioned at the second substrate mounting-and-collecting position, and a sensor (hereinafter, referred to as a second limit position sensor) 75 configured to detect that the second stage 22 is positioned at a forward limit position. Outputs from these sensors 71 to 75 are sent to the control unit 4. The respective sensors 71 to 75 may be selected as needed from mechanical sensors such as a proximity sensor or a limit switch, and photo sensors and the like.

Subsequently, a sequence program mounted in the control unit 4 will be described with reference to FIG. 6. FIG. 6 is a drawing for explaining the sequence program mounted on the control unit 4 and schematically illustrating an operation of the apparatus. The following description also describes an embodiment of a method of irradiating polarized light for photo alignment.

In the initial state in which the operation of the apparatus is started, the first stage 21 is at the first substrate mounting-and-collecting position, and the second stage 22 is at the second substrate mounting-and-collecting position as illustrated in the drawing (1) in FIG. 6. In this state, the robot, which is not illustrated in FIG. 6, places the substrate S on the first stage 21. When the substrate sensor 71 in the first stage detects the placement of the substrate S and a detection signal is transmitted to the control unit 4, the sequence program activates the substrate aligner 6 for the substrate S on the first stage 21. Consequently, the movable base 20B moves in the XYθ direction, and predetermined position and posture of the substrate S are achieved.

Figure 6A:
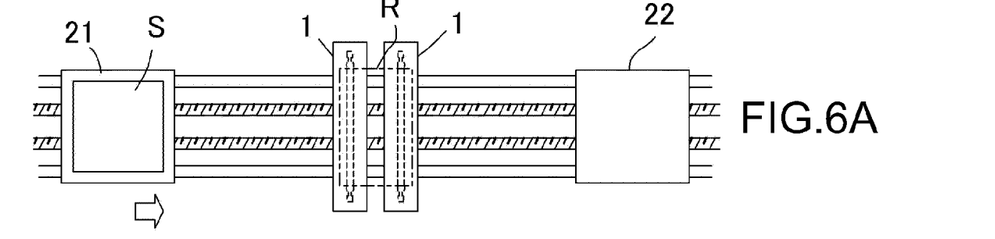
FIG. 6A is a first drawing for explaining a sequence program mounted on a control unit 4 and schematically illustrating an operation of the apparatus.
Figure 6B:
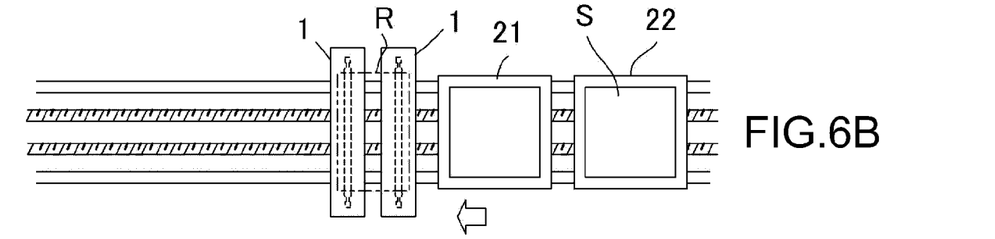
FIG. 6B is a second drawing for explaining a sequence program mounted on a control unit 4 and schematically illustrating an operation of the apparatus.

Subsequently, the sequence program sends a control signal to the stage movement mechanism 3 to drive the first drive source 321 to cause the first stage 21 to move forward by a predetermined stroke. The predetermined stroke corresponds to a stroke by which the first stage 21 passes through the irradiated area R and reaches the first forward limit position as illustrated in the drawing (2) in FIG. 6. The first forward limit position is a position where a rear end of the first stage 21 matches an end of the irradiated area R or a position a bit forward thereof.

Figure 6C:
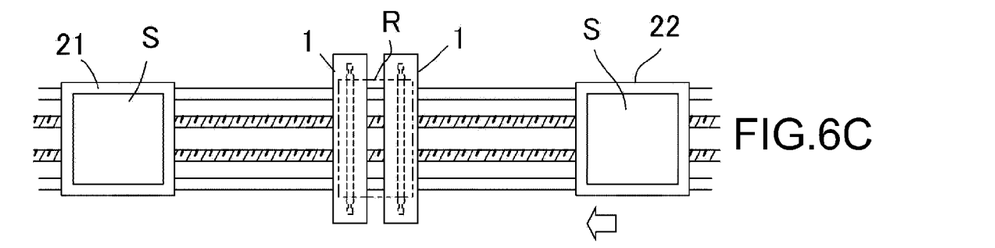
FIG. 6C is a third drawing for explaining a sequence program mounted on a control unit 4 and schematically illustrating an operation of the apparatus.

When the fact that the first stage 21 reaches the first forward limit position is confirmed by the first limit position sensor 73, the sequence program sends a control signal to the first drive source 321 to invert the first stage 21 and move the same backward by the same stroke. Accordingly, as illustrated in the drawing (3) in FIG. 6, the first stage 21 returns back to the first substrate mounting-and-collecting position. During this operation, a mounting operation of the substrate S to the second stage 22 is performed at the second substrate mounting-and-collecting position. In other words, the robot places the substrate S on the second stage 22 with a predetermined time lag by a control signal from the sequence program. On the second stage 22, the placement of the substrate S is confirmed by the substrate sensor 71 in the same manner, and then the sequence program activates the substrate aligner 6 for the substrate S on the second stage 22 to perform alignment. As illustrated in the drawing (3) in FIG. 6, when the first stage 21 returns back to the first substrate mounting-and-collecting position, the alignment on the second stage 22 is terminated.

Figure 6D:
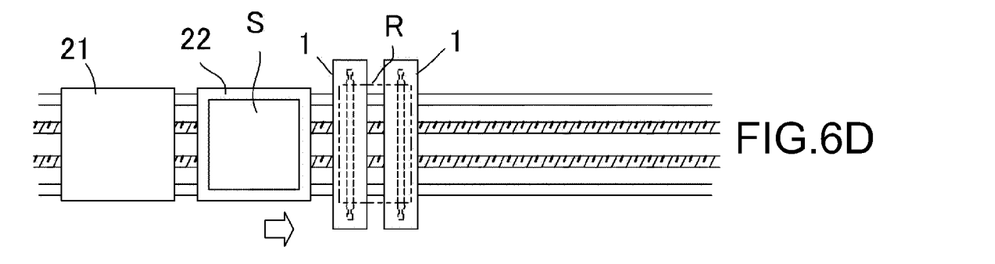
FIG. 6D is a fourth drawing for explaining a sequence program mounted on a control unit 4 and schematically illustrating an operation of the apparatus.

In this state, the sequence program sends a control signal to the second drive source 322 to drive the second drive source 322 to cause the second stage 22 to move forward by a predetermined stroke. The predetermined stroke corresponds to a stroke by which the second stage 22 passes through the irradiated area R and reaches the second forward limit position as illustrated in the drawing (4) in FIG. 6. The second forward limit position is a position where a rear end of the second stage 22 matches the end of the irradiated area R or a position a bit forward thereof.

Figure 6E:
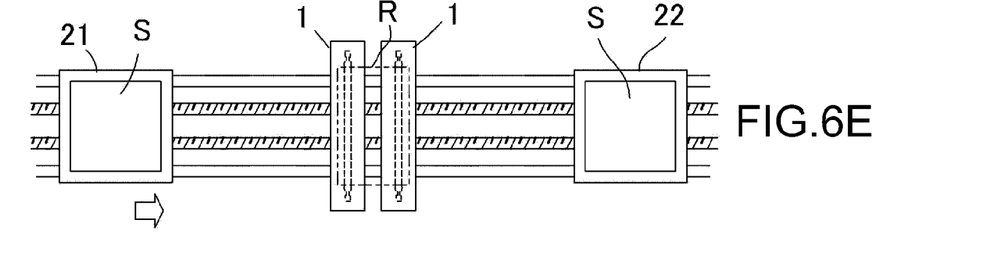
FIG. 6E is a fifth drawing for explaining a sequence program mounted on a control unit 4 and schematically illustrating an operation of the apparatus.

When the fact that the second stage 22 reaches the second forward limit position is confirmed by the second limit position sensor 75, the sequence program sends a control signal to the second drive source 322 to invert the second stage 22 and move the same backward by the same stroke. Accordingly, as illustrated in the drawing (5) in FIG. 6, the second stage 22 returns back to the second substrate mounting-and-collecting position. During this operation, the fact that the first stage 21 is positioned at the first substrate mounting-and-collecting position is confirmed by the first load position sensor 72, and then the substrate S is collected from the first stage 21 and a next substrate S is mounted on the first stage 21 at the first substrate mounting-and-collecting position. In other words, the robot removes the substrate S from the first stage 21, and mounts the next substrate S on the first stage 21.

Then, as illustrated in the drawing (5) in FIG. 6, when the second stage 22 is returned back to the second substrate mounting-and-collecting position, the mounting operation of the next substrate S on the first stage 21 is terminated, and the alignment of the substrate S is terminated. The sequence program emits a control signal again to the first drive source 321 and drives the same to move the first stage 21 to the first forward limit position and return the same again to the first substrate mounting-and-collecting position in a state illustrated in the drawing (5) in FIG. 6. During this operation, the fact that the second stage 22 is returned to the second substrate mounting-and-collecting position is confirmed by the second load position sensor 74, and then the substrate S is collected from the second stage 22, a next substrate S is mounted on the second stage 22, and the alignment of the second stage 22 is performed in the second substrate mounting-and-collecting position. The operation from then onward is the same, and the sequence program is programmed to perform photo alignment on the two stages 21 and 22 alternately by a repetition of the operation as described thus far by the apparatus. The substrate S is transported by the transporting mechanism such as the AGV or the conveyor to the robot, is subjected to the photo alignment, and then is transported to the position of the apparatus for the next process by the transporting mechanism.

According to the polarized light irradiating apparatus or method for photo alignment of the embodiment relating to the configuration and operation as described above, since the substrates S on the respective stages 21 and 22 are irradiated with polarized light by the movement of the two stages 21 and 22 passing through a single irradiated area R which is irradiated with polarized light alternately, the operation to collect a substrate S from and to mount a next substrate S on one of the stages 21 and 22 may be performed during the operation to irradiate a substrate S on the other one of the stages 21 and 22 with polarized light. Therefore, the tact time may be reduced significantly, and hence a photo alignment process with higher productivity is achieved.

At this time, a space L1 having at least the length of the substrate S on the second stage 22 is secured between the first substrate mounting-and-collecting position and the irradiated area R, and a space L2 having at least the length of the substrate S on the first stage 21 is secured between the second substrate mounting-and-collecting position and the irradiated area R. Therefore, the stages 21 and 22 are prevented from interfering with each other, and the respective substrates S are allowed to pass through the irradiated area R.

Suppose that the spaces between the respective substrate mounting-and-collecting positions and the irradiated area R have a length smaller than the lengths of the respective substrates S, the substrates S cannot pass through the irradiated area R without causing the interference between the stages 21 and 22. In this case, the exposure amount of the polarized light on an area on the back side of the substrate S in the length direction (the direction of movement) is reduced in comparison with other areas, so that uneven photo alignment process results.

Discussing the tact time rather strictly, the relationship $T_{L1}+T_{L2}+T_{L3} \leq T_{E1}+T_{E2}$ is satisfied, where $T_{L1}$ is a time length required for collecting the substrate S from one of the stages 21 and 22, $T_{L2}$ is a time length required for mounting the substrate S on one of the stages 21 and 22, $T_{L3}$ is a time length required for alignment of the mounted substrate S, $T_{E1}$ is a time length required for moving the other one of the stages 21 and 22 from the substrate mounting-and-collecting position to the forward limit position, and $T_{E2}$ is a time length for returning the other one of the stages 21 and 22 from the forward limit position to the substrate mounting-and-collecting position.

However, a configuration in which an outbound movement (a movement from the substrate mounting-and-collecting position to the forward limit position) of one of the stages 21 and 22 follows a homebound movement (a movement returning from the forward limit position back to the substrate mounting-and-collecting position) of the other one of the stages 21 and 22 is also applicable. In this case, the relationship $T_{L1}+T_{L2}+T_{L3} \leq T_{E1}$ is satisfied. In this configuration, further shortening of the tact time is achieved.

In the above-described example, although the entire part of a time zone during which collection and mounting of the substrate S are performed for one of the stages 21 and 22 overlaps with a time zone during which the movement of the other one of the stages 21 and 22 is performed, partial overlapping is also applicable. In this case, even when the mounting of the substrate S in one of the stages 21 and 22 is completed, the movement of the other one of the stages 21 and 22 is not completed. Therefore, there may arise waiting time. If there is the waiting time, the tact time is increased correspondingly. However, the tact time may be shortened in comparison with the case where there is only one stage, and the productivity is increased.

In the embodiment described above, the respective stages 21 and 22 are irradiated with polarized light when reaching the respective forward limit positions and when returning from the respective advanced positions to the substrate mounting-and-collecting positions, and the both exposure amounts correspond to the integrated exposure amount. However, this is not a requisite, and a condition in which light is blocked by a shutter or the light source 11 is turned off to achieve a state in which no polarized light is irradiated when returning is applicable, for example. Be that as it may, if the polarized light is blocked by the shutter, the light source 11 is turned on wastefully, and when the light source 11 is turned on and off, an unstable time zone until the lighting state is stabilized is increased. When the polarized light is irradiated only in one of outbound and homebound, the speed of movement of the stages 21 and 22 is obliged to be reduced disadvantageously in order to secure the required integrated exposure amount. When the polarized light is irradiated in both the outbound and the homebound, the speed of movement may be increased and hence the productivity may further be enhanced without such a problem.

In the apparatus of the embodiment, the operation to cause the respective stages 21 and 22 to pass through the irradiated area R is performed after the alignment of the substrates S mounted on the stages 21 and 22, and hence the orientation of the polarized light axis of the irradiated polarized light matches the predetermined orientation with high degree of accuracy. Therefore, the quality of the photo alignment process is further increased.

The orientation of the polarized light axis of the polarized light with which the irradiated area R is irradiated is defined by the posture of the polarized light elements 14. In the case of the polarized light element of the wire grid described above, much polarized light having an electric field component in the direction vertical to the direction in which the wire grid (stripe grid) extends is irradiated, and hence the film material is aligned in this orientation. In the apparatus of the embodiment, the polarized light elements 14 are arranged so that the polarized light axes are oriented in the width direction (the length direction of the light sources 11 in the irradiating units 1) of the stage movement mechanism 3 illustrated in FIG. 1, for example. In this case, if the width direction of the substrates S on the stages 21 and matches the width direction of the stage movement mechanism 3 with high degree of accuracy, the film materials on the substrates S are also photo-aligned in the width direction with high degree of accuracy. The respective substrate aligners 6 have a significance in causing the direction of the photo alignment to match the predetermined direction with high degree of accuracy as described above.

The accuracy in orientation of the photo alignment is mainly alignment in the θ direction. However, the alignment in a width direction has a significance in preventing the substrates S to be transported in a state in which the substrate S is partly protruded from the irradiated area R. The irradiated area R is set as an area in which the luminance of the polarized light in the area is sufficiently uniform. Therefore, if the substrate S is protruded out of the area, the luminance of the polarized light is lowered in the protruded portion, and hence the exposure amount runs short. Therefore, the photo alignment becomes insufficient at the corresponding portion. In the embodiment, the alignment is also performed in the width direction, such a problem does not occur.

In the apparatus of the embodiment, since the pair of guide members 31 are also used for moving the first and second stages 21 and 22, the configuration of the stage movement mechanism 3 is simplified, and the cost of the apparatus may be reduced. However, a configuration in which the first and second stages 21 and 22 are guided by separate guide members is also applicable.

Furthermore, the stage movement mechanism 3 may use a linear motor stage which floats with air and moves with a magnetic force instead of the ball screws. When using the linear motor stage, the guide mechanism may not be provided.

In the embodiment described above, the position for mounting the substrate S and the position for collecting the substrate S of the first stage 21 need to be set on one side of the irradiated area R and the position for mounting the substrate S and the position for collecting the substrate S of the second stage 22 need to be set on the other side of the irradiated area R. However, the mounting position and the collecting position do not have to be the same position on one side. The same applies to the other side. For example, the substrate collecting position may be set to a position closer to the irradiated area R with respect to the substrate mounting position on one side. In this case, the substrates S after photo alignment is applied are removed from the stages 21 and 22 at the substrate collecting position, the stages 21 and 22 are further retracted to reach the substrate mounting position, where the next substrates S are mounted. In this case, as regards the substrate collecting position, the above-described spaces L1 and L2 may not have to be secured without problem.

The two stages 21 and 22 need to pass through the one irradiated area R alternately. However, the number of the irradiating units 1 does not have to be two as described above. A configuration in which only one irradiating unit 1 irradiates the single irradiated area R with polarized light, and a configuration in which three or more irradiating units 1 irradiate the single irradiated area R with polarized light is applicable.

In the invention of this application, the term "stage" needs to be broadly interpreted than in the normal case. In other words, there is a case where the substrate S is placed on a plurality of pins having a suction hole such as vacuum contact and is adsorbed onto the plurality of pins, and the substrate S passes through the irradiated area by moving the plurality of pins integrally therewith. Therefore, the "stage" needs only to be a member which can move the substrate while holding the substrate, and does not necessarily have to be a bed-type member.

As regards the robot, there are a case where a single robot performs mounting and collection of the substrate S between the first and second stages 21 and 22, and a case where robots are provided for each of the first and second stages 21 and 22 to perform mounting and collection of the substrate S respectively.

Alternatively, although a liquid crystal substrate with the film material adhered thereto is assumed as the substrate S, there are a case where substrates for display devices other than a liquid crystal display are irradiated with polarized light for photo alignment as objects, and a case where polarized light is irradiated for the purpose of correcting an angle of view field.

The preceding description has been presented only to illustrate and describe exemplary embodiments of the present polarized light irradiating apparatus and method of irradiating polarized light for photo alignment. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A polarized light irradiating apparatus for photo alignment comprising:
   an irradiating unit configured to irradiate a preset irradiated area with polarized light;

a stage on which a substrate is placed; and a stage movement mechanism configured to cause the substrate on the stage to be irradiated with the polarized light by moving the stage to the irradiated area, wherein the stage includes two of first and second stages;

the stage movement mechanism is configured to move the first stage from a first substrate mounting position set on one side of the irradiated area to the irradiated area and to move the second stage from a second substrate mounting position set on the other side of the irradiated area to the irradiated area, the stage movement mechanism is configured to return the first stage to a first side after passage of the substrate on the first stage through the irradiated area and to return the second stage to a second side after passage of the substrate on the second stage through the irradiated area, and a space larger than a length by which the substrate on the second stage passes through the irradiated area is secured between the first stage positioned at the first substrate mounting position and the irradiated area, and a space larger than a length by which the substrate on the first stage passes through the irradiated area is secured between the second stage positioned at the second substrate mounting position and the irradiated area.

2. The polarized light irradiating apparatus for photo alignment according to claim 1, wherein the irradiating unit is configured to irradiate the substrates on the respective stages with the polarized light when the first and second stages move both outbound and homebound.

3. The polarized light irradiating apparatus for photo alignment according to claim 1, wherein the first and second stages each are provided with a substrate aligner configured to direct the orientation of the substrate mounted thereon to a predetermined orientation with respect to a polarized light axis to be irradiated.

4. The polarized light irradiating apparatus for photo alignment according to claim 1, wherein the stage movement mechanism includes a guide member along a direction of movement of the first and second stages, and the guide member is used both as a guide for the movement of the first stage and a guide for the movement of the second stage.

5. A polarized light irradiating method for photo alignment for irradiating a substrate with polarized light for photo alignment by using the polarized light irradiating apparatus for photo alignment according to claim 1, comprising:

a first substrate mounting step of mounting a substrate on the first stage at the first substrate mounting position;

a second substrate mounting step of mounting a substrate on the second stage at the second substrate mounting position;

a first movement step of moving the first stage on which the substrate is mounted from the first substrate mounting position and returning the first stage to a first substrate collecting position set on the one side after passage of the substrate through the irradiating area;

a second movement step of moving the second stage on which the substrate is mounted from the second substrate mounting position and returning the second stage to a second substrate collecting position set on the other side after passage of the substrate through the irradiating area;

a first substrate collecting step of collecting the substrate from the first stage at the first substrate collecting position; and a second substrate collecting step of collecting the substrate from the second stage at the second substrate collecting position, wherein a time zone during which the first substrate collecting step and the first substrate mounting step are performed overlaps entirely or partly with a time zone during which the second movement step is performed, and a time zone during which the second substrate collecting step and the second substrate mounting step are performed overlaps entirely or partly with a time zone during which the first movement step is performed.

* * * * *